A. AICHELE.
MAGNETO IGNITION APPARATUS.
APPLICATION FILED MAY 15, 1917.

1,391,234.

Patented Sept. 20, 1921.
3 SHEETS—SHEET 1.

Section A-B

Section C-D

A. Aichele. Inventor
by Albert E. Parker
Attorney

A. AICHELE.
MAGNETO IGNITION APPARATUS.
APPLICATION FILED MAY 15, 1917.
1,391,234.
Patented Sept. 20, 1921.
3 SHEETS—SHEET 2.
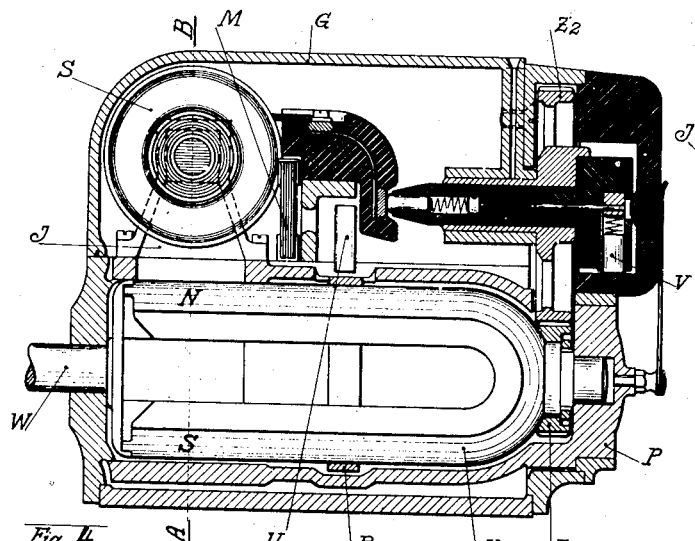
Fig. 4
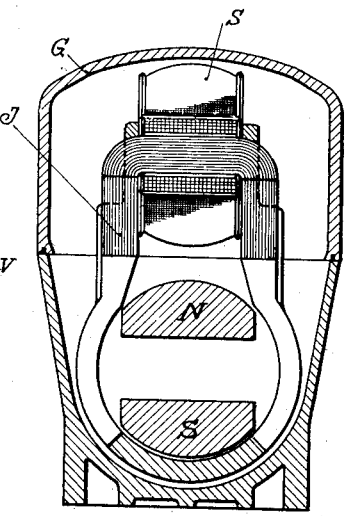
Fig. 5  Section A-B
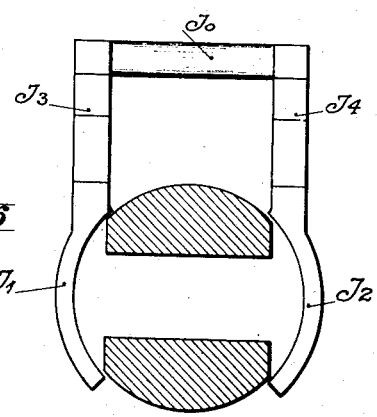
Fig. 6
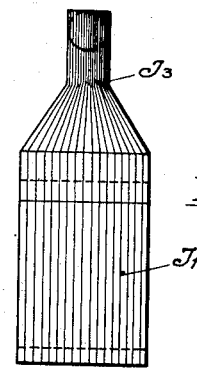
Fig. 7
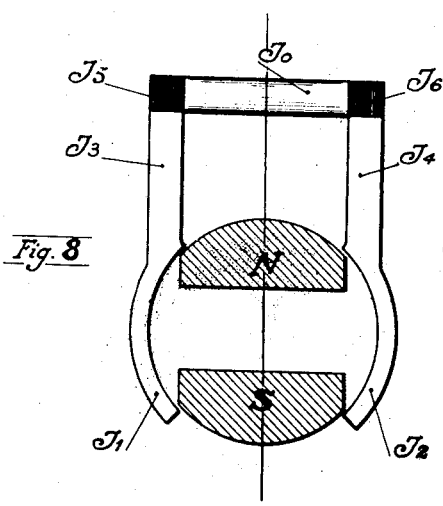
Fig. 8
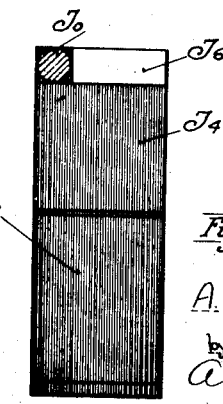
Fig. 9
A. Aichele, Inventor
by Albert E. Parker
Attorney A. AICHELE.
MAGNETO IGNITION APPARATUS.
APPLICATION FILED MAY 15, 1917.
1,391,234.
Patented Sept. 20, 1921.
3 SHEETS—SHEET 3.
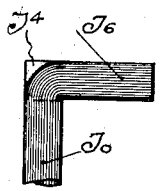
Fig. 10
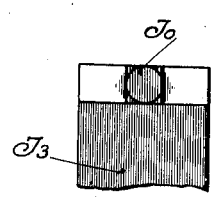
Fig. 11
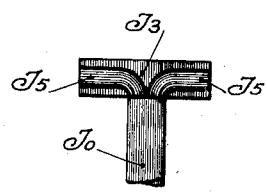
Fig. 12
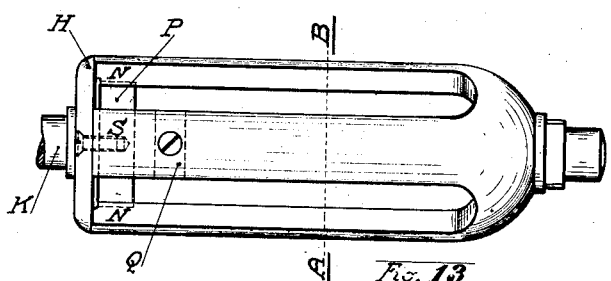
Fig. 13
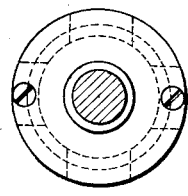
Fig. 14
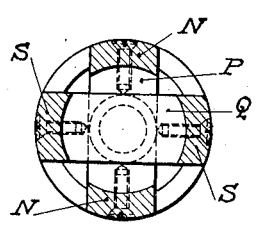
Fig. 15
Section A-B
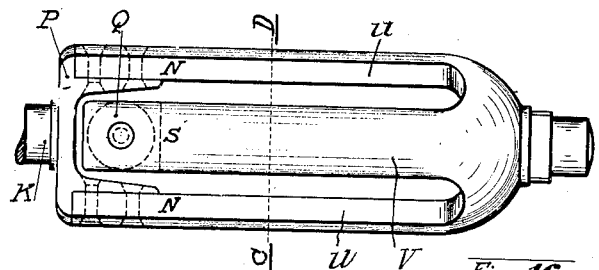
Fig. 16
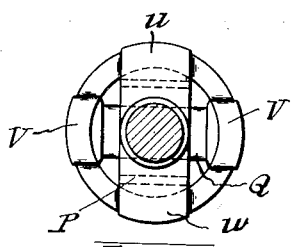
Fig. 17
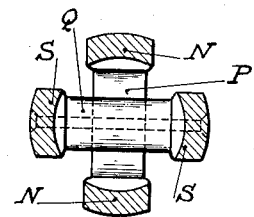
Fig. 18 - Section C-D
A. Aichele, Inventor
by Albert E. Parker
Attorney

UNITED STATES PATENT OFFICE.

ALBERT AICHELE, OF BADEN, SWITZERLAND, ASSIGNOR TO A. G. BROWN BOVERI & CIE., OF BADEN, SWITZERLAND.

MAGNETO-IGNITION APPARATUS.

1,391,234.      Specification of Letters Patent.      Patented Sept. 20, 1921.

Application filed May 15, 1917. Serial No. 168,734.

*To all whom it may concern:*

Be it known that I, ALBERT AICHELE, a citizen of the Swiss Republic, residing at No. 10 Wiesenstrasse, Baden, Switzerland, have invented certain new and useful Improvements in Magneto-Ignition Apparatus, of which the following is a specification.

The construction of magneto ignition apparatus for internal combustion engines is already known in the form wherein a double-T armature is employed as the rotating element. Constructions of this kind have undoubtedly given satisfactory results. They have however certain drawbacks mainly due to the circumstance that the high tension winding and the low tension winding and also the armature core have to be accommodated in a limited space. As this circumstance renders it very difficult to provide the requisite turns for the windings, the entire apparatus has consequently to be made larger.

It has been tried at different times to arrange the windings on a separate yoke outside the rotating element, in which case the reversal of the magnetic flux in this yoke is produced by the rotation of a magnetic connector between the magnet and the yoke. This arrangement has certainly the advantage of leaving sufficient room for the windings, but on the other hand it has the disadvantage that the magnetic circuit is compelled to bridge double air gaps, which circumstance diminishes considerably the efficiency of the entire apparatus and necessitates increasing its dimensions.

Now the present invention has for its object to provide an improved type of construction of magneto ignition apparatus, which combines the advantages of arranging the windings on a separate yoke, with the best possible magnetic circuit, and is characterized at the same time by the feature that owing to the peculiar arrangement of the various parts in a common casing, it occupies a minimum space while affording a maximum reliability in working, and yet provides ready accessibility of all the parts that are of importance for the maintenance of the reliability in working.

These advantages are attained by making the primary and also the secondary of the induction winding stationary and arranging them on an iron yoke situated outside the magnet, and producing the reversal of the magnetic flux in this iron yoke by moving the poles of the magnet directly past the free ends of the iron yoke. With this object, the magnet is mounted so as to be capable of rotation on its longitudinal axis.

The occupation of a minimum space in this improved type of construction for magneto ignition apparatus is achieved by the fact that instead of mounting the interrupter at one side of the axis of the apparatus outside the other parts of the apparatus, as has been the usual practice hitherto, the interrupter is now mounted in the same casing as the magnet in such a manner that the over-all length of the ignition apparatus does not exceed the length of the magnets inclusive of the bearings. This is done by utilizing the periphery of the rotating magnet directly or indirectly for operating the interrupter.

In the case of ignition apparatus for multi-cylinder engines, an increase in the over-all length due to the distributer, is at the same time avoided by arranging this device also in the casing common to all the parts of the apparatus, in such a manner that the over-all length of the apparatus is not thereby rendered greater than the length of the magnet inclusive of the bearings.

Some practical constructions of ignition apparatus of the improved type are illustrated by way of example in the accompanying drawings in which:—

Fig. 4 is a longitudinal section and

Fig. 5 is a cross section on the line A—B of Fig. 4 of a modification.

Figs. 6 and 7 are respectively a front elevation and a side elevation of a construction wherein the direction of the lamination of the yoke is maintained unaltered throughout the entire magnetic circuit of the yoke.

Figs. 8, 9 and 10 are respectively a front elevation, side elevation, and a plan of a modification.

Figs. 11 and 12 are a cross section and plan respectively of a further modification.

Fig. 13 is a side elevation.

Fig. 14 is a rear elevation, and

Fig. 15 is a cross section on the line A—B of Fig. 13, of another modification.

Fig. 16 is a side elevation,

Fig. 17 is a rear elevation, and

Fig. 18 is a cross section on the line C—D of Fig. 16, of a further modification.

Figure 1:
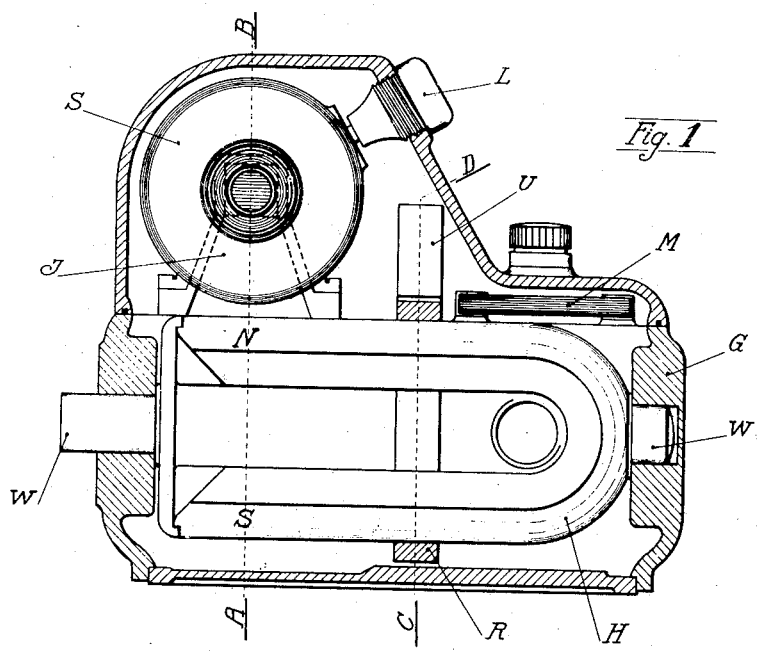
Figure 1 is a longitudinal section of an ignition apparatus for a single-cylinder engine.
Figure 2:
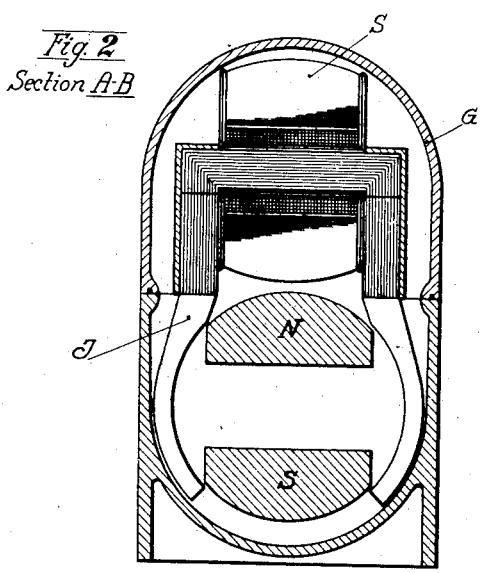
Figs. 2 and 3 are cross sections respectively on the lines A—B and C—D of Fig. 1.
Figure 3:
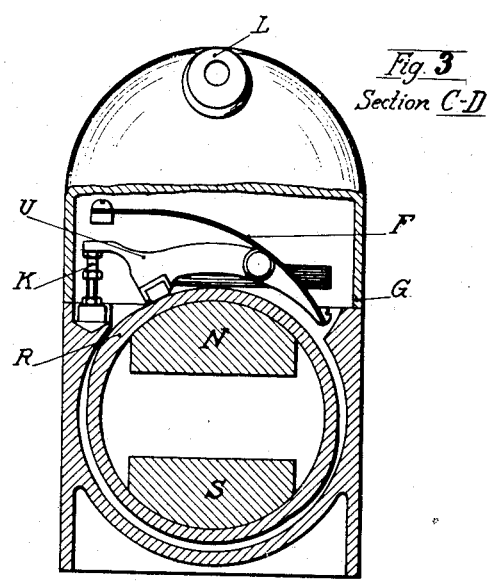

In the embodiment illustrated in Figs. 1, 2 and 3, the horseshoe magnet has a cylindrical external contour, and is rotatably mounted by means of shaft journals W in ball bearings; it is closely surrounded by a common casing G of the apparatus. Its N and S poles move past the ends of the stationary yoke J upon which is mounted the winding S composed of a primary and a secondary. A ring R is mounted on the periphery of the magnet; this ring by means of its external contour which has an eccentric shape at two diametrically opposite places, serves to break the contact at K by lifting at intervals the interrupter lever U which is held down by the spring F.

The condenser M is likewise arranged in the common casing. The high tension lead passes to the sparking plugs by way of the exit socket L which is made of insulating material. Instead of mounting a ring R upon the periphery of the magnet, the actual periphery of this magnet may be utilized as a direct means of operating the interrupter, the said periphery being specially formed for that purpose.

In the modification shown in Figs. 4 and 5 illustrating the manner in which the various parts may be arranged in apparatus for multi-cylinder engines having a high tension distributer and a device for varying the time of ignition, the rotary horseshoe magnet H, the interrupter U, the winding S on the yoke J, the high tension distributer V which is driven by toothed gearing $Z_1$, $Z_2$, from the shaft W, and the condenser M are contained in the common casing G which incloses all the parts. For the purpose of varying the time of ignition the yoke which carries the winding S, is mounted on a separate sleeve P which incloses the magnet and is capable of being adjusted from the outside.

The peculiar conformation of the iron yoke in the improved type of construction has an essential influence on the size of the entire ignition apparatus. The yoke is made with wide surfaces at its free ends to receive the lines of force that issue from the poles of the horseshoe magnet. In the portion however that extends through the winding, the iron cross section of the yoke is reduced to the smallest possible area of a circle. This enables the length of the winding to be reduced to a minimum, and consequently also the ohmic resistance of the winding to be reduced to a minimum. The consequent minimum consumption of copper is however *per se* not the deciding advantage. The deciding advantage is that which is based on the following consideration.

An increasing ohmic resistance produces an increased flattening of the curve of the current which rises on the starting of the apparatus. Now since a certain minimum of current is absolutely necessary for starting the engine at a certain speed of revolution, this minimum current must be provided for by a corresponding increased size of the entire apparatus in apparatus of the type hitherto usually employed wherein no attention is paid to getting the minimum length of wire in the winding. The peculiar conformation of the iron yoke in its capacity of support for the winding according to this invention has therefore a direct influence on the dimensions of the entire apparatus.

The practical construction of the improved yoke may be effected in several ways.

In the modification shown in Figs. 6 and 7 the parts $J_1$ and $J_2$ opposite the magnet poles are made wider by means of suitable intermediate layers between the several laminations or by arranging the laminations at a distance from one another. The laminations continued past the parts $J_3$ and $J_4$ are contracted at their upper ends where they inclose between them the similarly laminated core $J_0$ which has been brought to a circular shape in cross section.

In the modification shown in Figs. 8, 9 and 10, the parts $J_3$ and $J_4$ are continued directly to the winding core $J_0$ in the same width as the parts $J_1$ and $J_2$. The circular winding core $J_0$ is mounted on the parts $J_3$ and $J_4$ by means of its extension members $J_5$ and $J_6$ which are of rectangular cross section and are bent at right angles to the said core.

In the modification shown in Figs. 11 and 12, the winding core $J_0$ is arranged at the middles of the side parts $J_3$, $J_4$, and its continuation $J_5$, $J_6$ on each side is divided, and the resulting halves are bent respectively at right angles toward each side and mounted on the side parts $J_3$ and $J_4$ respectively.

A difficulty in achieving the essential advantage of the hereinbefore described improved type of construction as regards its occupying only a small space, occurs immediately it is desired to adopt it for ignition apparatus for 8 and 12-cylinder engines wherein four ignitions are necessary during each revolution of the magnetic igniter. An obvious idea would be to utilize the four poles of the rotary magnet (which are then necessary) in a 4-pole armature and for this purpose, instead of only one yoke J, providing two yokes each of which has a winding S. In that arrangement the two windings may be employed in series connection, or in parallel connection, or independently of each other. The space required for such an arrangement however is extremely large, so that an important advantage of the hereinbefore described improved type of construction is thereby lost. The space requirement however is considerably smaller if a 2-pole armature is combined with the 4-pole magnet, and only one of the two yokes is provided with a winding, the other yoke being left without winding and serving solely as a magnetic connector for the two magnet poles that remain free each time. The space requirement of the entire apparatus can be considerably reduced in this manner. The efficiency of the igniting magnet is however diminished because the second yoke which is without winding undergoes a reversal of its magnetization, but does not help in generating current.

The hereinafter described construction according to the present invention now allows not only of avoiding this drawback, but also of attaining a further considerable advantage as regards the small space requirement and the simplicity of the type of construction. This improved arrangement consists in connecting the diametrically opposite similar poles of the 4-pole horseshoe magnet directly together in a magnetically conducting manner, and thus coupling them in parallel. This has the result that the magnetic flux from all four poles is utilized in a single yoke, and the 4-pole arrangement of the ignition apparatus does not take up more space than the 2-pole arrangement. From a constructional point of view the advantage is also gained that the connecting pieces between the similar poles of the magnet may serve to carry its journal.

Figs. 13, 14 and 15 illustrate an example of a construction with a bell-shaped magnet. The similar N N and S S poles of this magnet are connected together respectively by cross-pieces P and Q of magnetically conducting material. A closing plate H of magnetically non-conducting material is mounted on the faces of the ends of the poles, and carries the journal K of the magnet.

In the modification shown in Figs. 16, 17 and 18, the 4-pole magnet is composed of two parts U V which are placed crosswise one above the other. Its similar N N and S S poles are connected together respectively by the magnetically conducting cross-pieces P and Q. The cross-piece P serves also as a means of attaching the journal K.

What I claim is:—

1. A multipolar bell-shaped permanent magnet for magneto ignition apparatus, magnetically conducting cross pieces directly connecting similar poles of the magnet, and a supporting stub shaft for the magnet connected with its poles.

2. A multipolar bell-shaped permanent magnet for magneto ignition apparatus, magnetically conducting cross pieces directly connecting similar poles of the magnet and a supporting stub shaft for the magnet carried by one of the connecting pieces.

3. A multipolar bell-shaped permanent magnet for magneto ignition apparatus, magnetically conducting cross pieces directly connecting similar poles of the magnet and disposed in spaced relation to each other, and a supporting stub shaft carried by the outer conducting cross piece.

In testimony whereof I have signed my name to this specification.

ALBERT AICHELE.